United States Patent
Zimmer et al.

(10) Patent No.: US 10,428,896 B2
(45) Date of Patent: Oct. 1, 2019

(54) CYLINDER-PISTON UNIT WITH A COMPENSATING SEALING ELEMENT

(71) Applicants: Martin Zimmer, Rheinau (DE); Guenther Zimmer, Rheinau (DE)

(72) Inventors: Martin Zimmer, Rheinau (DE); Guenther Zimmer, Rheinau (DE)

( * ) Notice: Subject to any disclaimer, the term of this patent is extended or adjusted under 35 U.S.C. 154(b) by 0 days.

(21) Appl. No.: 15/987,150

(22) Filed: May 23, 2018

(65) Prior Publication Data
US 2018/0266512 A1 Sep. 20, 2018

Related U.S. Application Data

(63) Continuation-in-part of application No. PCT/DE2016/000420, filed on Nov. 25, 2016.

(30) Foreign Application Priority Data

Nov. 26, 2015 (DE) .......................... 10 2015 015 170

(51) Int. Cl.
*E05F 5/02* (2006.01)
*F16F 9/36* (2006.01)
(Continued)

(52) U.S. Cl.
CPC ................ *F16F 9/368* (2013.01); *E05F 3/10* (2013.01); *E05F 5/006* (2013.01); *E05F 5/02* (2013.01);
(Continued)

(58) Field of Classification Search
CPC . Y10T 16/5383; Y10T 16/61; E05Y 2900/20; E05Y 2900/202; E05Y 2900/204;
(Continued)

(56) References Cited

U.S. PATENT DOCUMENTS 3,269,718 A     8/1966   Bourcier De Carbon
4,871,238 A *  10/1989   Sato ....................... G02B 15/10
                                                              359/675
(Continued)

FOREIGN PATENT DOCUMENTS

DE              27 38 809 A1    3/1979
DE       10 2011 083744 A1      4/2013
(Continued)

OTHER PUBLICATIONS

The English translation of the "International Search Report" for the corresponding international application No. PCT/DE2016/000420, dated Mar. 2, 2017, 3 pages.

*Primary Examiner* — Chuck Y Mah
(74) *Attorney, Agent, or Firm* — Ronald S. Lombard

(57) ABSTRACT

In a hydraulic cylinder piston unit comprising a cylinder with an interior space delimited by opposite end walls in which a piston and a compensation seal element are movably arranged supported by a piston rod and engaged by a compensation spring disposed between the compensation seal element and an adjacent cylinder end wall, the compensation seal element has two spaced seal rings via which it is guided along the inner cylinder wall and the compensation spring is supported directly on the compensation seal element for an improved sealing effect of the compensation seal element in the extended state of the hydraulic cylinder piston unit and a simplified design.

7 Claims, 3 Drawing Sheets

Figure 1:
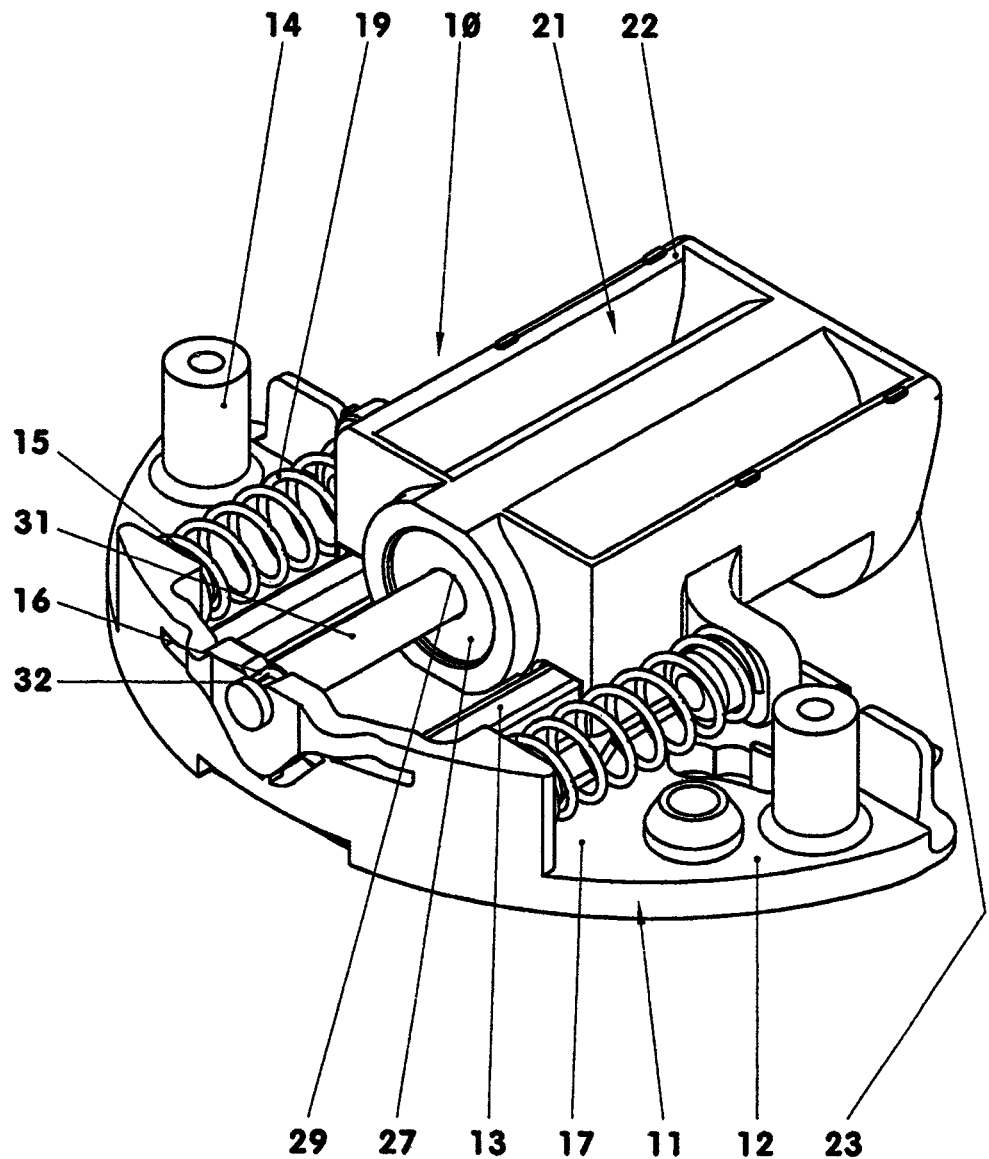

(51) Int. Cl.
*E05F 5/00* (2017.01)
*E05F 3/10* (2006.01)
*F16F 9/19* (2006.01)
*F16F 9/50* (2006.01)
*F16J 15/00* (2006.01)

(52) U.S. Cl.
CPC ............... *F16F 9/19* (2013.01); *F16F 9/50* (2013.01); *F16J 15/002* (2013.01); *E05Y 2201/21* (2013.01); *E05Y 2201/256* (2013.01); *E05Y 2201/264* (2013.01); *E05Y 2900/20* (2013.01); *F16F 2228/001* (2013.01); *F16F 2228/066* (2013.01)

(58) Field of Classification Search
CPC ........... E05Y 2900/208; E05Y 2201/20; E05Y 2201/21; E05Y 2201/264; E05F 5/006; E05F 5/02; E05F 3/10; E05D 11/1021; E05D 11/1042; E05D 11/105; E05D 11/1064; E05D 7/04; E05D 7/0407; E05D 7/125; E05D 3/142; F16F 9/368; F16F 9/50; F16F 9/19; F16F 2228/001; F16F 2228/066; F16J 15/002
See application file for complete search history.

(56) References Cited

U.S. PATENT DOCUMENTS

| | | | | |
|---|---|---|---|---|
| 5,579,874 A | * | 12/1996 | Jeffries | E05F 1/16 188/282.9 |
| 5,913,391 A | * | 6/1999 | Jeffries | F16F 9/061 188/316 |
| 7,100,907 B2 | * | 9/2006 | Fitz | F16F 9/0218 188/271 |
| 8,336,166 B2 | * | 12/2012 | Kim | E05F 5/006 16/82 |
| 8,763,204 B2 | * | 7/2014 | Inaguchi | E05F 5/003 16/82 |
| 10,094,157 B2 | * | 10/2018 | Pyo | F16F 9/3415 |
| 2002/0162450 A1 | | 11/2002 | Frost | |
| 2006/0118371 A1 | * | 6/2006 | Zimmer | F16F 7/09 188/280 |
| 2011/0253493 A1 | * | 10/2011 | Svara | F16F 9/0218 188/313 |
| 2013/0000075 A1 | * | 1/2013 | Forster | E05F 5/006 16/84 |
| 2013/0160242 A1 | * | 6/2013 | Brunnmayr | E05F 5/006 16/286 |
| 2014/0290002 A1 | * | 10/2014 | Lautenschlager | E05F 5/02 16/84 |
| 2014/0352111 A1 | * | 12/2014 | Ng | E05F 5/02 16/286 |
| 2016/0076618 A1 | * | 3/2016 | Svara | E05F 3/12 188/316 |

FOREIGN PATENT DOCUMENTS

| | | |
|---|---|---|
| DE | 10 2013 001 650 A1 | 7/2014 |
| GB | 813 551 A | 5/1959 |
| GB | 1333782 | 10/1973 |
| JP | 2007 255446 A | 10/2007 |

* cited by examiner

CYLINDER-PISTON UNIT WITH A COMPENSATING SEALING ELEMENT

This is a Continuation-In-Part application of pending international patent application PCT/DE2016/000420 filed Nov. 25, 2016 and claiming the priority of German patent application DE 10 2015 015 170.3 filed Nov. 26, 2015.

BACKGROUND OF THE INVENTION

The present invention resides in a hydraulic cylinder piston unit with a cylinder having a cylinder inner space limited by a cylinder inner wall and two end walls with a piston guided in the cylinder inner space by a piston rod and an elastically deformable compensating sealing element which is movable relative to the piston and a spring arranged between the compensating sealing element and an adjacent end wall delimiting the cylinder inner space.

DE 10 2013 001 650 A1 discloses such a cylinder piston unit. It comprises a spring-biased compensation piston provided with a seal element.

It is the object of the present invention to simplify the design of such a cylinder-piston unit.

SUMMARY OF THE INVENTION

In a hydraulic cylinder piston unit comprising a cylinder with an interior space which is delimited by opposite end walls and in which a piston and a compensation seal element are movably arranged supported by a piston rod and engaged by a compensation spring disposed between the compensation seal element and an adjacent cylinder end wall, the compensation seal element has two spaced seal rings via which it is guided along the inner cylinder wall and the compensation spring is supported directly on the compensation seal element providing for an improved sealing effect of the compensation seal element in the extended state of the hydraulic cylinder piston unit and a simplified design.

The invention will become more readily apparent from the following description of an exemplary embodiment described below with reference to the accompanying drawings.

BRIEF DESCRIPTION OF THE ACCOMPANYING DRAWINGS

Figure 2:
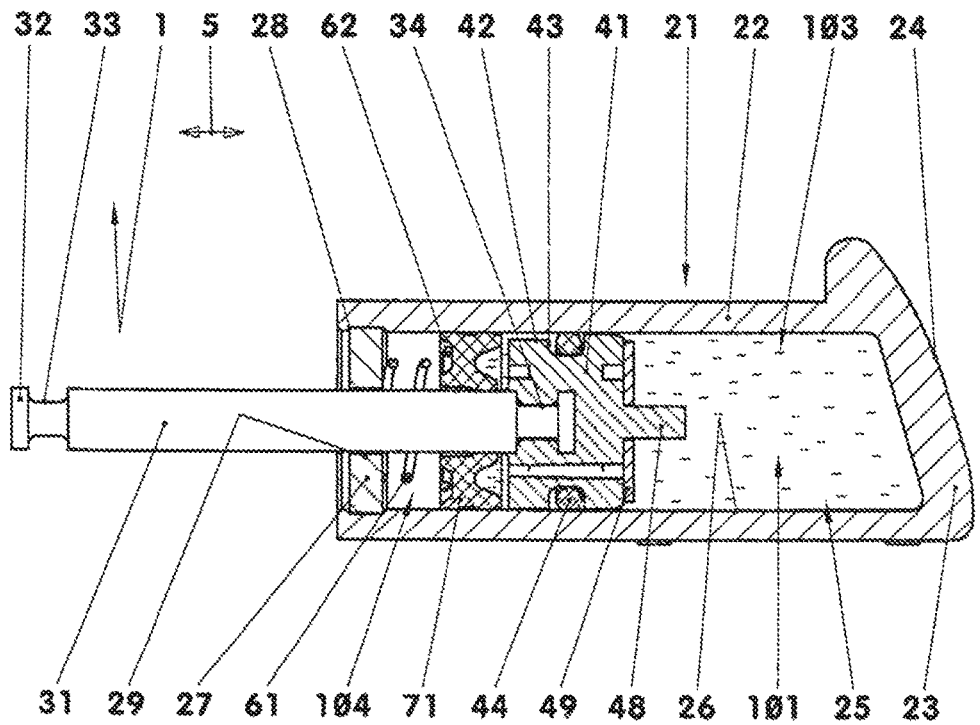

It is shown in:

FIG. 1: A perspective bottom view of the cylinder-piston damper unit,

FIG. 2: A longitudinal cross-sectional view of a cylinder-piston unit in an extended state, FIG. 3: A longitudinal cross-sectional view of a cylinder piston unit with the piston inserted, FIG. 4: a perspective view of the compensation sealing element as seen from the piston side, FIG. 5: a perspective view of the compensation sealing element from the cylinder head cover side, and FIG. 6: a cross-sectional representation of the compensation seal element in a non-deformed state.

DESCRIPTION OF A PARTICULAR EMBODIMENT

FIG. 1 shows a damper unit 10 of the type as they are used for example in cup hinges adapted to decelerate the movement of furniture parts which are movable relative to each other. Herein the damper unit 10 is arranged for example in a hinge cup of the cup hinge.

The damper unit 10 which is shown in FIG. 1 from the bottom side thereof includes a support part 11, a cylinder-piston unit 21 and two return springs 19. The support part 11 comprises for example a semi-circular support disc 12, which is provided with a cylinder guide structure 13, a support pin 14 and a spring receivers 15. The support disc 12 further has a piston rod receiver 16 in which the piston rod 31 of the cylinder-piston unit 21 is supported so that the cylinder 22 is axially movable in the cylinder guide structure. The cylinder 22 is supported on the spring receiver 15 of the support part 11 by the return springs 19. The return springs 19 are compression springs which bias the cylinder-piston unit 21 in the extended direction. The support pins 14 projecting from the bottom side 17 of the support disc 12 support the damper unit 10 in the hinge cup.

The cylinder 22 of the cylinder piston unit 21 has a cylinder bottom wall 23 whose outer surface 24 extends beyond the support disc 12. With a damper unit 10 installed into a hinge cup, the inclined cylinder bottom wall 23 extends into the hinge cup. In this way, during closing of the hinge, a mounting arm or a joint arm can slide along the cylinder bottom wall 23 whereby the cylinder 22 is moved in the direction toward the piston rod head 32 of the piston rod 31.

FIG. 2 shows in a longitudinal cross-sectional view the cylinder-piston unit 21 in a retracted position. The cylinder 22 of the shown hydraulic cylinder-piston unit 21 has a cylinder interior space 25 with a circular inner cross-sectional area. The interior cylinder space 25 is delimited by an inner cylinder wall 26, the cylinder bottom wall 23 and a cylinder head cover 27. The cylinder bottom wall 23 and the cylinder head cover 27 form end walls 23, 27 of the cylinder interior space 25. In the exemplary embodiment, the cylinder interior space 25 has a diameter of 4.3 mm.

The inner cylinder wall 26 has in its end area facing the piston rod head 32 a circumferential annular groove 28 in which the cylinder head cover 27 is accommodated with a transition fit. In the exemplary embodiment, the cylinder head cover 27 is a plane parallel disc with a bore 29, through which the piston rod 31 extends. The diameter of the bore 29 is for example greater by one tenth of a millimeter then the diameter of the piston rod 31. The diameter of the bore 29 of the cylinder head cover 27 may be for example up to 60% greater than the diameter of the piston rod 31. In the exemplary embodiment the cylinder head cover 27 is manufactured of polyoxymethylene (POM). The thickness of the cylinder head cover 27 is for example between 15% and 25% of the inner diameter of the cylinder interior space 25 which extends between cylinder bottom wall 23 and the annular groove 28. In the exemplary embodiment, the thickness of the cylinder head cover 27 is 18.6% of the diameter of the cylinder interior space 25.

The cylindrical piston rod 31 has in the exemplary embodiment a diameter of 35% of the inner diameter of the cylinder interior space 25 and a length of 13.75 mm. At its opposite ends, the piston rod 31 is provided with identical annular grooves 33, 34. When the damper 10 is installed, an outer annular groove 33 is retained in the piston rod receiver 16 of the support part 11. The inner annular groove 34 is engaged with a piston 41.

The piston 41 is cylindrical and is provided at its circumference with an annular groove 43 in which a piston seal element 44 is disposed. In the exemplary embodiment, the piston seal element 44 is for example an O-ring. At its front end 45 facing the piston rod 31, the piston 41 is provided with a piston rod recess 46. This piston rod recess 46 is shaped complementary with respect to the piston-side end of the piston rod 31 wherein the piston engages, that is extends into, the annular groove 34 of the piston rod 31.

At the front end 47 of the piston 41 facing away from the piston rod recess 46, the piston 41 is provided with a central guide pin 48 on which a piston disc 49 is supported so as to be axially movable on the guide pin 48. The stroke of the piston disc 49 is limited by the piston 41 and for example by a thickened area of the guide pin 48. The piston disc 49 has for example a thickness of 0.25 mm. In the exemplary embodiment, the piston disc 41 is flexible. Its outer diameter is for example 90% of the outer diameter of the piston 41. When the piston disc 49 abuts the piston 41, there remains for example a residual gap between the piston front end face 47 and the piston disc 49.

At both end faces 45, 47 of the piston 41 annular collection grooves 51, 52 are formed into the piston 41 which grooves have the same depths and which are disposed opposite each other. The piston rod-side collection groove 51 has parallel groove flanks whereas the groove flanks 53 of the piston disc-side collection groove 52 in the exemplary embodiment, have an opening angle of 1.2 degrees.

The two collection grooves 51, 52 are in communication with each other via three communication passages 54. These communication passages are arranged at the same distance from one another. Their cross-sectional area corresponds to an oval curved along the collection groove 51, wherein the cross-sectional area increases toward the piston disc-side collection groove 52. The opening angle corresponds in the exemplary embodiment to the opening angle of the groove flanks 53 of the piston disc-side collection groove 52.

Between the piston 41 and the cylinder head cover 27, a compensation spring 61 and a compensation seal element 71 are arranged. The compensation spring 61 is a coil spring in the form of a compression spring. It extends around the piston rod 31 and is supported on the cylinder head cover 27. In the exemplary embodiment, this compensation spring 61 has two and one half turns and a constant wire diameter of 0.2 mm. The turn diameter of the compensation spring 61 at its end remote from the cylinder head cover 27 is for example by 11% greater than the smallest turn diameter.

Figure 4:
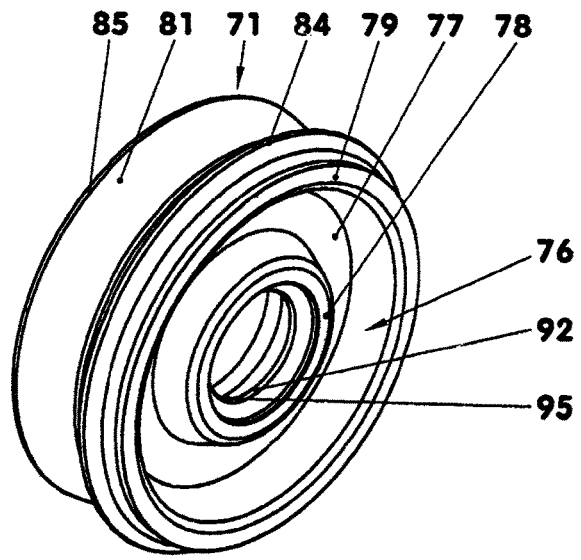
Figure 5:
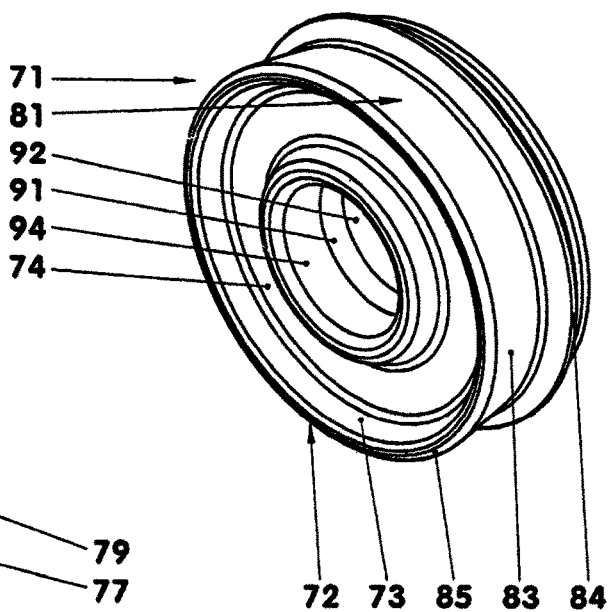
Figure 6:
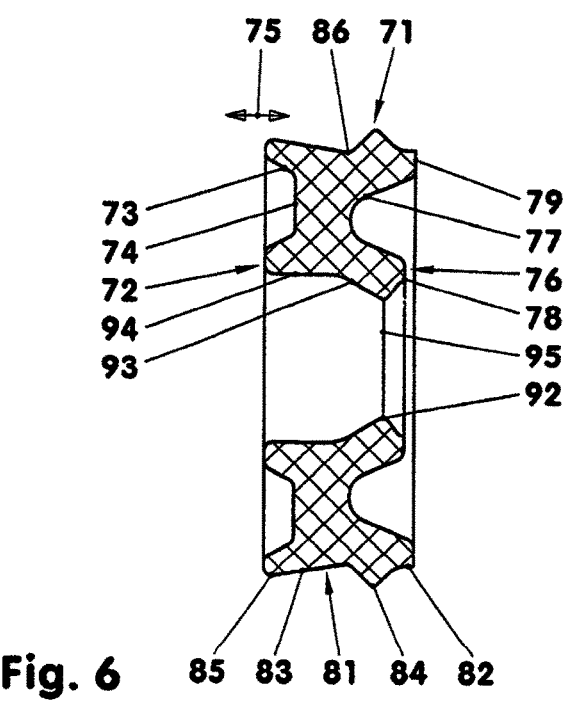

The compensation seal element 71 is shown in FIGS. 4 and 5 as an individual component and in FIG. 6 in a cross-sectional representation. It is annular and has for example an outer diameter of 4.6 mm and an inner diameter of 26% of the outer diameter. The outer diameter is consequently in the exemplary embodiment greater by 7% than the inner diameter of the cylinder 22 so that the compensation seal element 71, when inserted into the cylinder 22, is pressed onto the inner cylinder wall. The length of the compensation seal element 71 is for example one third of its outer diameter when not deformed. The inner diameter of the undeformed compensation seal element 71 is 80% of the outer diameter of the piston rod 31 so that, when installed, the compensation seal element 71 is pressed onto the piston rod 31. The inner diameter may be for example between 70% and 90% of the piston rod diameter. In the exemplary embodiment, the compensation seal element 71 consists of nitrile butadiene rubber (NBR) with a hardness of 70 shore.

At its front side 72 facing the cylinder head cover 27, the compensation seal element 71 has an annular spring accommodation groove 73 which has a depth of for example 0.3 mm. The groove bottom 74 of the spring accommodation groove 73 is provided in the area of the compensation seal element 71 which is delimited by two seal rings 84, 85. The width of the spring accommodation groove 73 normal to the longitudinal direction 75 of the compensation seal element 71 is for example one tenth of the outer diameter. This width is symmetrical to a virtual annular center line of the spring accommodation grooves 73 whose diameter is 67% of the outer diameter of the compensation seal element 71. The diameter of this annular centerline is outside of the average diameter of the compensation seal element 71 as determined by the inner diameter and the outer diameter thereof.

The front side 76 facing away from the cylinder head cover 27 and toward the piston 41 has a stepped shape with an annular pressure groove 77 of about U-shaped cross-section. The diameter of the circle present in the apex disposed in the U is for example 61% of the outer diameter of the compensation seal element 71. The inner step 78 of the front side 76 is displaced by 7% of the length of the compensation seal element 71 with respect to the outer step 79 in the direction away from the piston 41.

At its circumferential surface 81, the compensation seal element 71 has a collar surface 82, a connecting surface 83 and two seal rings 84, 85. In the longitudinal cross-sectional view as shown in FIG. 6, the contour line of the circumferential surface 81 is a steadily differentiable line.

The collar surface 82 adjoins the piston-side front surface 76 of the compensation seal element 71. It is cylindrically shaped. Its diameter is for example 91% of the outer diameter of the compensation seal element 71.

Following the collar surface 82, there is a first seal ring 84 with an outer diameter corresponding to the outer diameter of the compensation seal element 71. It is between 5% and 10% greater in diameter than the inner diameter of the cylinder interior space 25. The tip radius of the contour line in the area of the first seal ring 84 is for example 1% of the outer diameter of the compensation seal element 71. The admissible eccentricity of the first seal ring 84 relative to the inner diameter of the compensation seal element 71 is for example also 1% of the respective outer diameter. The center distance of the seal ring 84 from the piston-side front surface 76 is for example 26% of the length of the compensation seal element 71.

The connecting surface 83 joins the two seal rings 84, 85. In the exemplary embodiment, it includes a recessed area 86 whose minimum diameter is smaller than the diameter of the collar surface 82.

The second seal ring 85 adjoins the front side 72 of the compensation seal element 71 oriented toward the cylinder head cover 27. Its outer diameter is in the exemplary embodiment 95% of the outer diameter of the compensation seal element 71. This is for example between 2% and 7% greater than the inner diameter of the cylinder interior space 25. The radius of the contour line in the area of the second seal ring 85 is in the exemplary embodiment 1.7% of the outer diameter of the compensation seal element 71. The distance between the two seal rings is for example 68% of the length of the compensation seal element 71. That distance however may be for example between 50% and 80% of the length of the compensation seal element 71.

The inner surface 91 of the compensation seal element 71 comprises an inner seal ring 92, a transition area 93 and a cylindrical area 94. The contour line of the inner surface 31 as shown in the longitudinal cross-sectional view of FIG. 6 is a steadily differentiable curve with an apex in the area of the inner seal ring 92. This apex is a point of a circular zenithal line 95 disposed in a plane extending normal to the longitudinal direction 75 of the compensation seal element 71. The inner diameter of the inner seal ring 92 corresponds to the inner diameter of the compensation seal element 71. In the longitudinal direction 75, the distance between the zenithal line 95 and the outer step 79 of the piston side front side 76 is 20% of the length of the compensation seal element 71. As a result, the inner seal ring 92 is disposed outside the area delimited by the two outer seal rings 84, 85. It is displaced toward the piston 41. In the longitudinal cross-section, the radius of curvature of the tip of the inner ring 92 is 1% of the outer diameter of the compensation seal element 71. The transition area 93 adjoining the inner seal ring 92 converges with the cylindrical area 94. The diameter of the cylindrical area 94 is in the exemplary embodiment 37% of the outer diameter of the compensation seal element 71. As a result, the inner diameter of the cylindrical area 94 is larger, by 13%, than the diameter of the piston rod 31. The cylindrical area 94 extends to the cylinder cover side front face 72 of the compensation seal element 71. The inner diameter of the front side 72 of the compensation element facing away from the piston 41 is 10% larger than the outer diameter of the piston rod 31.

During assembly of the cylinder-piston unit 21, the piston 41 is placed onto the piston rod 31 with the piston seal ring 44 and the piston disc 49 already disposed on the piston 41 and locked to the piston rod 31. In addition, the compensation seal element 71 may already have been slipped onto the piston rod 31 with a deformation of the inner seal ring 92.

This preassembled unit may be inserted into the cylinder 2 which has already been filled with oil 103. The compensation spring 61 is then slipped onto the piston rod 31 in such a way that the larger end 62 abuts the compensation seal element 71. The end 62 of the compensation spring 61 abuts the compensation seal element 71 in this way outside, the medium diameter of the compensation seal element 71. Finally, the cylinder head cover 27 is slipped onto the piston rod 31 and locked in the annular groove 28 of the inner cylinder wall 26. In the assembled state, the piston rod 31 is in an almost completely extended position. In the cylinder interior space 25, the compensation spring 61 is not tensioned and the compensation seal element 71 abuts the piston 41 or is slightly spaced therefrom.

The cylinder-piston unit 21 can now be placed into the support part 11. In this process, the cylinder 22 is inserted into the cylinder guide structure 13 and the piston rod 31 is locked into the annular groove 33 in the piston rod receiver 16. After insertion of the return springs 19, the damper unit 10 may be installed into a hinge cup of a cup hinge for example of a closet door.

Figure 3:
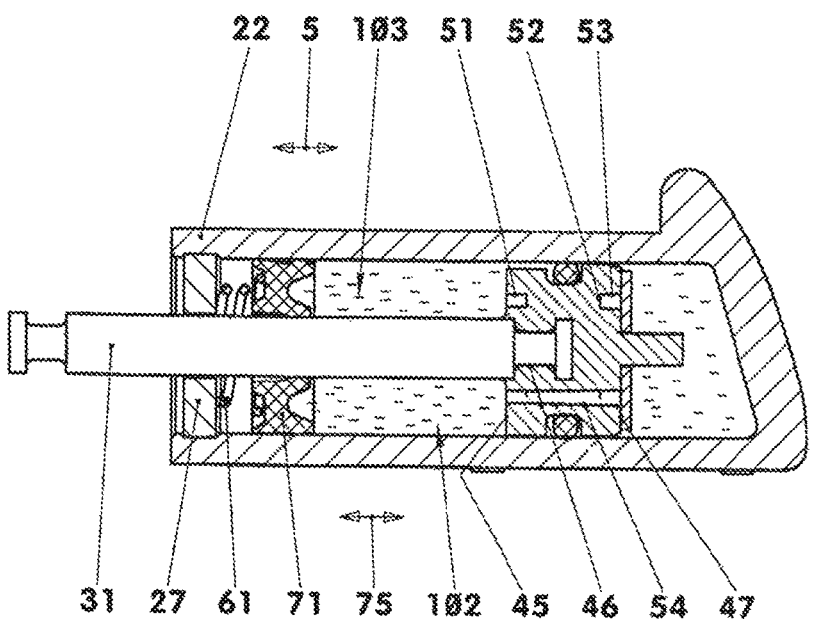

A mounting arm for example comes during closing of the door in contact with the cylinder bottom wall 23 and slides along the cylinder bottom wall 23. This causes the cylinder 22 to be moved against the force of the cylinder piston unit 21 and the return springs 19 in the longitudinal direction 5 of the cylinder piston unit 21. The longitudinal direction 5 of the cylinder piston unit 21 is oriented in the same direction as the longitudinal direction of the compensation seal element 71. In the cylinder piston unit 21, the cylinder 22 is displaced relative to the stationary piston rod 31 which is supported by the hinge cup. Within the cylinder interior space 25, the piston 41 separates a displacement space 101 formed between the cylinder bottom wall 23 and the piston 41 from a compensation space 102 formed between the piston 41 and the compensation seal element 71. With this load on the piston, oil 103 is displaced from the displacement space 101 for example via the gap between the piston disc 49 and the piston 41 and is discharged through the gap between the piston disc 49 and the piston 41 and via the communication passages 54 of the piston 41 to the compensation space 102. The compensation seal element 71 is biased against the force direction of the compensation spring 61. The surface load on the piston side 76 of the compensation element 71 is almost constant. The piston rod slides along the inner sealing ring 92 from the extended position as shown in FIG. 2 toward the inserted position as shown in FIG. 3. The torque forces effective on the compensation element 71 are counteracted by the compensation spring 61 which contacts the compensation seal element 71 off-enter and which stabilizes the compensation element 71 with a counter torque force. The compensation seal element 71 is biased by means of the compensation spring 61 in such a way that the contact pressure of the inner seal ring 92 on the piston rod 31 is increased.

The compensation seal element 71 separates the compensation space 102 hermetically from a spring space 104 in which the compensation spring 61 is arranged. The oil-less spring space 104 is in the exemplary embodiment not sealed toward the ambient 1.

When the piston 41 comes to a standstill within the cylinder 22, for example at the end of a stroke, an at least nearly uniform surface pressure continues to be effective on the front or piston side 76 of the compensation seal element 71. The compensation spring 61 applies a pressure force to the compensation seal element 71 whereby the second outer seal ring 85 is pressed onto the inner cylinder wall 26 with an increased force. This three-line support of the compensation element 71 ensures a sealing effect when the cup hinge is being closed and when it is in a closed state.

Upon opening of the cup hinge, the mounting arm is for example lifted off the cylinder bottom wall 23, whereby the cylinder 22 is moved by the return springs 19 toward its extended position. It moves relative to the piston rod 31 from the retracted state as shown in FIG. 3 to the extended state as shown in FIG. 2. During this step, the oil 103 is displaced from the compensation space 102 and flows via the communication passages 54 of the piston 41 into the displacement space 101. The piston disc 49 can be lifted off the piston front end 45 so that there is essentially no flow restriction.

In the cylinder interior space 25, the compensation spring 61 moves the compensation seal element 71 relative to the piston rod 31 toward the piston 41. In this way, the second outer seal ring 85 is pressed onto the inner cylinder wall 26 and the inner seal ring 92 is pressed onto the piston rod 31. The compensation seal element 71 in this way seals the compensation space 102 hermetically from the spring space 104 of the cylinder interior space 25 so that no oil 103 can leak into the spring space 104.

As soon as the cylinder-piston unit has again reached the position as shown in FIG. 2, the damper unit 10 is ready for a renewed closing of the pot hinge.

The cylinder-piston unit 21 may also be designed in such a way that the displacement space 101 is arranged at the piston rod side. With such an embodiment, the piston disc 49 is for example arranged at the piston rod side of the piston 41. The compensation seal element 71 can then be arranged on either side of the piston 41, wherein it would be supported by means of the piston 41. It would then be supported by means of the compensation spring 61 on the nearest front wall 23, 27 of the cylinder 22.

Also, combinations of the various embodiments are conceivable.

LISTING OF REFERENCE NUMERALS

| | |
|---|---|
| 1 | Ambient |
| 5 | Longitudinal direction |
| 10 | Damper unit |

-continued

| | |
|---|---|
| 11 | Support part |
| 12 | Support disc |
| 13 | Cylinder guide structure |
| 14 | Support pin |
| 15 | Spring receiver |
| 16 | Piston rod receiver |
| 17 | Bottom side |
| 19 | Return spring |
| 21 | Cylinder-piston unit |
| 22 | Cylinder |
| 23 | Cylinder bottom wall |
| 24 | Outer surface |
| 25 | Cylinder interior space |
| 26 | Inner cylinder wall |
| 27 | Cylinder head cover |
| 28 | Annular groove |
| 29 | Bore |
| 31 | Piston rod |
| 32 | Piston rod head |
| 33 | Outer annular groove |
| 34 | Inner annular groove |
| 41 | Piston |
| 42 | Circumferential surface |
| 43 | Annular seal element groove |
| 44 | Piston seal element |
| 45 | Front end |
| 46 | Piston rod recess |
| 47 | Front end face |
| 48 | Guide pin |
| 49 | Piston disc |
| 51 | Collection groove |
| 52 | Piston disc-side collection groove |
| 53 | Groove flanks |
| 54 | Communication passages |
| 61 | Compensation spring |
| 62 | End of spring |
| 71 | Compensation seal element |
| 72 | Front side |
| 73 | Spring accommodation groove |
| 74 | Groove bottom |
| 75 | Longitudinal direction |
| 76 | Front-side facing away from the cylinder head cover |
| 77 | Pressure groove |
| 78 | Inner step |
| 79 | Outer step |
| 81 | Circumferential surface |
| 82 | Collar surface |
| 83 | Connecting surface |
| 84 | Seal ring |
| 85 | Seal ring |
| 86 | Recessed area |
| 91 | Inner surface |
| 92 | Inner seal ring |
| 93 | Transition area |
| 94 | Cylindrical area |
| 95 | Zenithal line |
| 101 | Displacement space |
| 102 | Compensation space |
| 103 | Oil |
| 104 | Spring space |

What is claimed is:

1. A hydraulic cylinder piston unit (21) comprising: a cylinder (22) with a cylinder interior space (25) delimited by an inner cylinder wall (26) and two cylinder end walls (23, 27), one of the cylinder end walls (23) being a cylinder bottom wall (23) and the other of the cylinder end walls (27) being a cylinder head cover (27), a piston (41) guided in the cylinder interior space (25) by a piston rod (31),
with an elastically deformable compensation seal element (71) which is supported in the cylinder interior space (25) so as to be movable relative to the piston (41), and
a compensation spring (61) arranged in the cylinder interior space (25) between the elastically deformable compensation seal element (71) and an adjacent cylinder end wall (23, 27) delimiting the cylinder interior space (25), wherein
the elastically deformable compensation seal element (71) has two spaced seal rings (84, 85) for being guided along the inner cylinder wall (26),
the compensation spring (61) is supported directly on the elastically deformable compensation seal element (71),
wherein the elastically deformable compensation seal element (71) includes an inner seal ring (92) for being additionally guided on the piston rod (31), and,
wherein the inner seal ring (92) is arranged displaced toward the piston (41) with respect to the section of the elastically deformable compensation seal element (71) which is delimited by the seal rings (84, 85).

2. The hydraulic cylinder piston unit (21) according to claim 1, wherein the distance between the seal rings (84, 85) is greater than 50% of the length of the elastically deformable compensation seal element (71).

3. The hydraulic cylinder piston unit (21) according to claim 1, wherein the elastically deformable compensation seal element (71) is provided at its front side (72) facing an adjacent cylinder end wall (23, 27) with an annular spring accommodation groove (73) in which the compensation spring (61) is supported.

4. The hydraulic cylinder piston unit (21) according to claim 3, wherein the annular spring accommodation groove (73) has a groove bottom (74) which is arranged within a section of the elastically deformable compensation seal element (71) that is delimited by the seal rings (84, 85).

5. The hydraulic cylinder piston unit (21) according to claim 1, wherein the compensation spring (61) is supported outside a medium diameter of the elastically deformable compensation seal element (71) which is defined between the inner diameter and the outer diameter of the elastically deformable compensation seal element (71).

6. The hydraulic cylinder piston unit (21) according to claim 1, wherein, with the elastically deformable compensation seal element (71) undeformed, the outer diameter of a first outer seal ring (84) facing the piston (41) is at least 5% and maximally 10% larger than the inner diameter of the cylinder interior space (25) and the outer diameter of a second outer seal ring (85) facing away from the piston (41) is at least 2% and maximally 7% greater than the inner diameter of the cylinder interior space (25).

7. The hydraulic cylinder piston unit (21) according to claim 1, wherein the inner diameter of the front side (72) of the elastically deformable compensation seal element (71) facing away from the piston (41) is at least 10% larger than the outer diameter of the piston rod (31).

* * * * *